United States Patent [19]
Graulus et al.

[11] Patent Number: 5,994,446
[45] Date of Patent: Nov. 30, 1999

[54] GELS MADE FROM TRIBLOCK COPOLYMERS

[75] Inventors: Hendrik Graulus, Veltem Beisem; Noel Overbergh, Rotselaar, both of Belgium; John Hudson, Swindon; Philip James Hammond, Wootton Bassett, both of United Kingdom; Jianming Yu, Brussels, Belgium; Anthony Perkins, Wootton Bassett, United Kingdom

[73] Assignee: Raychem Limited, Swindon, United Kingdom

[21] Appl. No.: 08/981,167

[22] PCT Filed: Jun. 10, 1996

[86] PCT No.: PCT/GB96/01381

§ 371 Date: May 25, 1998

§ 102(e) Date: May 25, 1998

[87] PCT Pub. No.: WO97/00292

PCT Pub. Date: Jan. 3, 1997

[30] Foreign Application Priority Data

Jun. 15, 1995 [GB] United Kingdom ............... 9512125
Apr. 26, 1996 [GB] United Kingdom ............... 9608748

[51] Int. Cl.$^6$ .................................... C08K 5/01
[52] U.S. Cl. ............................................. 524/484
[58] Field of Search ............................... 524/484

[56] References Cited

U.S. PATENT DOCUMENTS

| | | | |
|---|---|---|---|
| 4,716,183 | 12/1987 | Gamarra et al. | 522/80 |
| 5,149,736 | 9/1992 | Gammara | 524/490 |
| 5,166,274 | 11/1992 | McGrath et al. | 525/310 |
| 5,442,004 | 8/1995 | Sutherland et al. | 524/140 |
| 5,541,250 | 7/1996 | Hudson et al. | 524/404 |
| 5,618,882 | 4/1997 | Hammond et al. | 525/95 D |

FOREIGN PATENT DOCUMENTS

| | | | |
|---|---|---|---|
| 0 431 706 A2 | 6/1991 | European Pat. Off. | C08F 8/04 |
| 0431706 | 6/1991 | European Pat. Off. | |
| 0 543 632 A1 | 5/1993 | European Pat. Off. | G03F 7/033 |
| WO 88/00603 | 1/1988 | WIPO | C08L 53/02 |
| WO 90/05166 | 5/1990 | WIPO | C08L 53/00 |
| WO 94/18273 | 8/1994 | WIPO | C08L 101/00 |

*Primary Examiner*—Edward J. Cain
*Attorney, Agent, or Firm*—Herbert G. Burkard; Yuan Chao

[57] ABSTRACT

Gels of oil-extended methacrylate-alkylene-methacrylate (M-A-M) triblock copolymers having higher glass transition temperatures than known styrene-alkylene-styrene triblock gels. The preferred M-A-M triblocks for making the new gels have polymethylmethacrylate end blocks and butadiene or ethylene/butylene mid-block, and are synthesised by methods in the public domain (inter alia Shell EP-A-0431706). Includes gels of new triblocks having end blocks of higher alkyl (e.g. isobornyl) methacrylate homopolymer or copolymers. Mixed methyl- and higher alkyl-methacrylate end blocks are preferred to reduce gel-formation problems which may arise from solubility parameter of homo-isobornylmethacrylate end blocks being too close to that of extender oil. Includes gels of new multi- (preferably penta-) block copolymers including styrene (S) blocks, e.g. M-S-A-S-M.

17 Claims, No Drawings

GELS MADE FROM TRIBLOCK COPOLYMERS

This invention relates to new and technically superior gel compositions.

Gels made from oil-extended poly(styrene)-poly (alkylene)-poly(styrene) triblock copolymers are known. For example, WO-A-9305113 (RK451) describes gels of poly(styrene)-poly(ethylene/butylene)-poly(styrene) (SEBS) triblocks with addition of diblocks (preferably poly (styrene)-poly(ethylene/propylene) diblocks) to improve resistance to exudation of the extender oil from the gel under pressure. WO-A-9323472 (RK469) describes gels of poly (styrene)-poly(ethylene/propylene)-poly(styrene) triblocks. The softening temperature of these gels may be undesirably low for some purposes, and WO-A-8800603 (RK308) describes polyphenylene ether additives for improving the softening temperature.

For brevity, triblock copolymers will hereinafter be identified by reference to the block-forming unit without repetition of the word "poly", for example the above SEBS triblocks would be shown as styrene-ethylene/butylene-styrene triblocks. Gels will preferably be identified as such by the physical test criteria described in WO-A-8800603.

The present invention provides a new class of triblock gel compositions, some of which may have advantageous softening temperatures and other characteristics. The invention provides a gel composition comprising a methacrylate (preferably alkyl- or aryl-methacrylate)-alkylene-methacrylate (preferably alkyl- or aryl-methacrylate) triblock copolymer having number average molecular weight Mn of at least 50,000, preferably at least 60,000, more preferably at least 70,000, and at least 200 (preferably at least 300, more preferably at least 400) parts by weight of extender liquid per 100 parts by weight of the triblock copolymer, which liquid extends and softens the polyalkylene mid-block of the triblock copolymer. In this invention, the term "alkylmethacrylate" includes cycloalkylmethacrylates; and the term "alkylene" referring to the mid-blocks includes hydrogenated alkylene.

In these methacrylate-alkylene-methacrylate (MAM) triblock copolymers, it is preferred that the methacrylate end blocks have Mn within the range from 6,000 (preferably 7,000) to 40,000, preferably 10,000 to 30,000. It is also preferred that the polyalkylene mid-blocks of the triblock copolymer have Mn within the range from 38,000 (preferably 40,000) to 150,000, preferably 50,000 to 140,000, more preferably 60,000 to 130,000. Within these molecular weight ranges, it has surprisingly been found possible to make gels from the MAM triblock copolymers having number average molecular weight Mn as low as 50,000, preferably at least 60,000 or 70,000, these being much lower than the usual molecular weights of the known styrene-alkylene-styrene (SAS) triblock copolymers used for making gels. Better gels are obtained when Mn of the MAM triblock is at least 80,000 and superior gels are obtained when Mn is at least 90,000. The molecular weights and composition of the triblocks will preferably be selected to give the methacrylate end blocks a glass transition temperature Tg of at least 90° C., preferably at least 100° C., with a view to making some MAM triblock gels with softening points considerably higher than those of the corresponding SAS triblock gels.

These new MAM gel compositions according to the present invention not only have higher softening temperatures than corresponding SAS triblock gels, but also tend to be unexpectedly softer and tackier. The gels may be formed either by masticating suitable exender liquid into the MAM triblocks in the heat-softened or molten state or by incorporating the extender liquid in a solution of the MAM triblock in a suitable solvent, then removing the solvent. The gels may be used in ways similar to those known for other gels, especially the aforementioned SAS triblock gels.

The preferred end blocks for these gel-forming MAM triblocks include polymethylmethacrylate (PMMA), and $C_2$-(preferably $C_4$-)-or-higher alkylmethacrylates, for example poly-t-butylmethacrylate, polycyclohexylmethacrylate, and isobornylmethacrylate. Arylmethacrylates, preferably phenylmethacrylate, may also be beneficial.

The polyalkylene mid-blocks of the gel-forming MAM triblocks may be unhydrogenated diene polymers, for example polybutadiene or polyisoprene, or preferably may be hydrogenated, for example polyethylene/butylene or polyethylene/propylene, or mixtures thereof. The mid-blocks are preferably more-or-less similar in composition to those described in the aforementioned three WO-A-publications, the disclosures of which are incorporated herein by reference. Thus, the MAM triblocks may for example be methacrylate-butadiene-methacrylate (MBM) triblocks, or methacrylate-ethylene/butylene(and/or propylene)-methacrylate (MEBM, MEPM, or MEB/EPM) triblocks.

The extender liquid (hereinafter "oil") may be any substantially non-volatile liquid capable of softening and extending the polyalkylene mid-blocks, preferably with little or no effect on the methacrylate end blocks. The oils may be similar to those described in the aforementioned three WO-A-publications, although somewhat higher naphthene content may be tolerable for the present gels than for the known styrene triblock gels. Because the preferred alkyl-methacrylate end blocks are non-aromatic, a higher aromatic content can also be tolerable in the extender oil for the present purposes than for the known styrene triblock gels.

The MAM triblocks may be prepared by any convenient method, for example the methods described in EP-A-0431706 (Shell) using conventional alkali metal alkyl difunctional initiators such as sec-butyl lithium or preferably tert-butyl lithium with meta-diisopropenylbenzene (m-DIB) described for example by Ladd and Hogen-Esch in Polym. Prepr., 30(1), 261, 1989, in cyclohexane/diethylether mixed reaction solvent.

Specific examples of the preparation of MAM triblocks will now be described, followed by illustrative examples of their use in gels according to this invention.

Polymerisation Example A

The starting materials and solvents were purified and/or thoroughly dried as appropriate by known methods. In a suitable stirred reaction vessel, a mixture of a 0.031M solution of m-DIB in cychohexane was warmed to 50° C. and titrated with a 0.24M tert-butyl lithium (tBuLi) solution in cyclohexane until the colour persisted, after which additional tBuLi solution was added, the time taken for the total additions of 8.4 ml of tBuLi being about 2 hours. Ten milliters of the resulting difunctional initiator mixture, after cooling to room temperature, were introduced into a 4 l glass reactor containing 700 ml dry cyclohexane and 40 ml dry diethyl ether. Fifty ml of dry butadiene were added and polymerised at room temperature overnight. At the end of the butadiene polymerisation, 1 ml of the reaction mixture was picked out for GPC analysis in order to measure the molecular weight Mn of the PBD mid-block, and 14 ml of a 0.45M 1,1-diphenylethylene (DPE) solution in cyclohexane were added for end-capping the PBD anions. The next step consisted of polymerisation of methylmethacrylate (MMA) initiated by the capped PBD anions with formation of the MMA-B-MMA triblock copolymer. The PBD reaction medium was cooled down to 0° C. and 2.3 ml of dry tetrahydrofuran (THF) were added. The reaction medium was further cooled down to −78° C. and 25 ml of dry MMA were added. One hour later, the reaction was terminated by adding 1ml of dry methanol. The final MMA-B-MMA triblock copolymer was recovered by precipitation in 61 of methanol, dried at room temperature under vacuum for two days, and contained 40 to 45% of 1,2-butadiene linkages with 60 to 55% 1,4-linkages.

Polymerisation Example B

Hydrogenation of the MMA-B-MMA triblock copolymer from Example A was carried out in dry toluene in the presence of a catalyst based on triethyl aluminum (EtAl) and cobalt(II)-ethylhexanoate (CoEH). The catalyst was prepared by mixing 50 ml of a 0.45M solution of EtAl in toluene and 16 ml of a 0.46M solution of CoEH in toluene so that the Al:Co molar ratio was 3.3. Twenty grams of the MMA-B-MMA triblock were dried by four azeotropic distillations with dry toluene in a 31 flask. Dry toluene (2.5 liters) was then added to dissolve the triblock, followed by 50 ml of the catalyst solution. The reaction mixture was transferred into a 51 autoclave equipped with a stirring device and hydrogen was introduced at 6 bar pressure and the hydrogenation performed at 60° C. for about 6 hours. The progress of the reaction was followed by FTIR analysis of samples withdrawn from the reactor at intervals. The hydrogenated MMA-EB-MMA triblock copolymer was recovered by precipitation in a 3:2 volume mixture of methanol and conc. HCl. Further purification was performed by successive dissolution in toluene at 60° C. and precipitation in methanol.

Polymerisation Example C

MMA-B-MMA triblocks were made by methods similar to Example A, and hydrogenated to give MMA-EB-MMA triblocks by methods similar to Example B, with the block molecular weights controlled by known methods of varying the reaction time and amounts of catalyst, to give a range of triblocks which are indicated in Gel Example 1 with the block molecular weights (Mn) in thousands determined by GPC analysis in a Waters GPC 501 using linear styragel columns with a flow rate of 1 ml/minute THF solvent against a polystyrene standard.

Gel Example 1

With reference to the following Table 1, unhydrogenated MMA-B-MMA (Sample M6-36) and hydrogenated (H) MMA-EB-MMA triblocks made according to Example C were dissolved in the indicated solvent (S) and the indicated extender oil (O) was added. On removal of the solvent from films cast from those solutions, triblock/oil gels were formed, whose triblock content (T %) and other characteristics (modulus G', tan delta, Tensile Strength T.S., Elongation to break E, and TMA softening point) are indicated with reference to tests known from the aforementioned published WO-A-references and elsewhere. The samples identified as G1650, G1654, and G1651 were made from known gel-forming SEBS triblocks available under the trade mark Kraton, and the samples S2006 and S4055 were made from known gel-forming SEPS and SEB/EPS triblocks available under the trade mark Septon. These comparison triblocks were similar to those identified in the aforementioned WO-A-publications, and were melt processed as described in those publications to form the gels of these comparision examples.

TABLE 1

| Sample | Mn(×1000) | S | O | T % | G' 0.1 Hz kPa | G' 1.0 Hz kPa | tan delta 1.0 Hz | T.S. kPa | E % | TMA ° C. |
|---|---|---|---|---|---|---|---|---|---|---|
| M6-18H | 13-69-13 | 2 | A | 12 | 3.60 | 4.85 | 0.31 | 33 | 559 | 172 |
| M6-17H | 19-69-19 | 2 | A | 12 | 2.44 | 3.16 | 0.30 | 21 | 511 | 169 |
| M6-20H | 14-81-14 | 2 | A | 12 | 3.88 | 4.89 | 0.25 | 6 | 272 | 170 |
| M6-19H | 25-81-25 | 2 | A | 12 | 2.55 | 3.83 | 0.36 | 11 | 384 | 188 |
| M6-30H | 25-80-25 | 1 | A | 12 | 2.07 | 2.49 | 0.24 | | | |
| M6-38H | 25-80-25 | 1 | A | 12 | 1.94 | 2.59 | 0.31 | 45 | 832 | 194 |
| M6-40H | 12-36-12 | 1 | A | 12 | 4.30 | 4.39 | 0.03 | 15 | 144 | 180 |
| M6-41H | 50-100-50 | 1 | A | 12 | 0.66 | 0.89 | 0.35 | 16 | 414 | 154 |
| M6-43-2H | 40-130-40 | 1 | A | 12 | 0.74 | 1.29 | 0.51 | 32 | 868 | 163 |
| JM-B9aH | 100-165-100 | 1 | A | 12 | 0.26 | 0.50 | 0.58 | 21 | 801 | 131 |
| M6-36 | 25-80-25 | 2 | A | 6 | | 1.60 | | | | |
| | | | | 12 | | 8.00 | | | | |
| | | | | 18 | | 52.0 | | | | |
| | | | | 24 | | 130 | | | | |
| G1650 | 14-66-14 | — | A | 12 | | 13.84 | 0.03 | 30 | 211 | 47 |
| G1651 | 38-178-38 | — | A | 12 | 6.74 | 7.39 | 0.09 | 470 | 1556 | 125 |
| G1654 | 22-105-22 | — | A | 12 | | 9.90 | 0.06 | 380 | 1118 | 87 |
| 52006 | 43-159-43 | — | A | 12 | 4.10 | 4.70 | 0.13 | 460 | 1303 | 131 |

Solvents:
1. THF:MEK9:1
2. Toluene
Oils:
A. Fina A360B

Gel Example 2

Melt-processed gels were prepared from MEBM triblock copolymers made according to Polymerisation Example B by mixing for 5 minutes in a 1 liter Waring Blendor the following amounts (% by weight of the composition) of the stated materials: 60 g (12%) MEBM Sample JM-16aH having Mn×1000 of 17-58-17; 435 g (87%) Fina A360B extender oil; 2.5 g (0.5%) Irganox 1010 antioxidant; 2.5 g (0.5%) Irgafos 168 antioxidant. The mixture was allowed to stand at ambient temperature for one week and was then placed in a 1 liter Z-blade mixer which had been pre-heated to 240° C. and was mixed under vacuum for 210 minutes at a rotor speed of 72 rpm. The resulting gel at about 220° C. was allowed to cool and tests were carried out on plaques pressed from the gel at 200° C. with the results shown in the following Table 2.

TABLE 2

| Sample | Mn (×1000) | G' 0.1 Hz kPa | G' 1.0 Hz kPa | tan delta 1.0 Hz | T.S. kPa | E % | TMA ° C. |
|---|---|---|---|---|---|---|---|
| JM-16aH | 17-58-17 | 2.84 | 3.36 | 0.21 | 7 | | 114 |

The present invention further includes new gels of MAM triblocks having higher alkyl methacrylates in their end blocks, some of which new gels may have even higher softening temperatures than, or other properties different from or advantageous over, the aforementioned MMA-alkylene-MMA triblock gels.

One further aspect of the invention accordingly provides a gel composition comprising an alkylmethacrylate-alkylene-alkylmethacrylate triblock copolymer having number average molecular weight Mn of at least 50,000, preferably at least 60,000 more preferably at least 70,000 and having at least 2, preferably at least 4, more preferably at least 8, carbon atoms in the alkyl group of the alkylmethacrylate, and at least 200 (preferably at least 300, more preferably at least 400) parts by weight of extender liquid per 100 parts by weight of the triblock copolymer, which liquid extends and softens the polyalkylene mid-block of the triblock copolymer.

The preferred end blocks comprise $C_4$-or-higher-alkyl methacrylates, for example t-butylmethacrylate, cyclohexylmethacrylate, or especially isobornylmethacrylate.

The new MAM triblock copolymers in which the methacrylate end blocks are entirely isobornylmethacrylate (IBMA) have desirably high Tg (e.g. 200° C.) and tensile strength. However, gels formed from them using the usual extender oils tend to have much-reduced strength, possibly owing to the solubility parameter of the IBMA blocks being relatively close to that of the alkylene mid-blocks such as ethylene/butylene (about 7.95). This may make the end blocks insufficiently resistant to the oils which extend and soften the mid-blocks, thus reducing the temperature performance normally derived from the phase separation of the relatively hard end blocks from the elastomeric mid-blocks in such gels. Solubility parameters for the following alkyl methacrylate esters are: methyl 9.45, ethyl 8.9, propyl 8.8, butyl 8.7, isobutyl 7.2, sec-butyl 7.2, n-hexyl 8.6, octyl 8.4, lauryl 8.2, isobornyl 8.1. Solubility parameters for FINA A360B oil and paraffin oil are about 7.05. Solubility parameter of the mid-block polyethylene-butylene is 7.95. Solubility parameters calculated for the mixed MMA-IBMA random copolymer end blocks at the following volume fractions of MMA are:

| vol. fraction MMA | sol. parameter |
|---|---|
| 0 | 8.1 |
| 0.2 | 8.38 |
| 0.5 | 8.78 |
| 0.8 | 9.2 |
| 1 | 9.45. |

Highly advantageous embodiments of the present invention may therefore result from the use of new MAM triblocks in which the methacrylate end blocks are random or block copolymers of the higher alkyl methacrylates with methylmethacrylate. Such mixed methacrylate copolymer end blocks may provide a solubility parameter which is further from that of the extender oil than is the solubility parameter of IBMA homopolymer end blocks, while still achieving Tg which is significantly higher than that of MMA homopolymer end blocks. The present invention accordingly includes gels wherein the methacrylate end blocks comprise a random or block copolymer of a $C_2$(preferably $C_4$)-or-higher alkyl methacrylate and methylmethacrylate, especially gels wherein the $C_4$-or-higher alkyl methacrylate is or includes IBMA.

Multi-block methacrylate copolymers, for example pentablocks incorporating two methacrylate blocks (e.g. IBMA-MMA-alkylene-MMA-IBMA) or incorporating other blocks (e.g. styrene) in addition to the methacrylate blocks (e.g. MMA-styrene-alkylene-styrene-MMA) may also provide advantageous gels. The invention accordingly includes a gel composition as hereinbefore described, wherein the said triblock copolymer incorporates further blocks, preferably styrene blocks or alkyl methacrylate blocks, thus constituting a multi-block (preferably pentablock) copolymer. The said multi-block copolymer preferably comprises either (a) at least two different methacrylate blocks M1, M2, or (b) at least one methacrylate block M and at least one styrene block S, on either end of the alkylene mid-block A, the multi-block copolymer thus preferably having the pentablock structure (a) M1-M2-A-M2-M1 or M-S-A-S-M.

The new triblocks and multiblocks and methods for synthesising them by appropriate sequential living anionic polymerisations are described hereinafter and are claimed in our co-pending British Patent Application No. 9608748.1 (RK549). Synthesis methods for these new block copolymers may also be adapted from those described in the aforementioned EP-A-0431706 and in the aforementioned paper by Ladd and Hogen-Esch in Polym. Prepr., 30(1), 261, 1989.

Specific examples of the preparation of the new gels using the higher-alkyl methacrylate triblocks, especially the aforementioned new MAM triblocks, will now be described.

Gel Example 3

A gel was made in a manner similar to that of Gel Example 1, using a tBuMA-EB-tBuMA triblock copolymer produced by methods similar to those described in Polymerisation Examples A to C with t-butylmethacrylate (tBuMA) replacing the MMA of those examples. The characteristics of the resulting gel are shown in Table 3.

TABLE 3

| Sample | Mn(×1000) | S | O | T % | G' 0.1 Hz kPa | G' 1.0 Hz kPa | tan delta 1.0 Hz | T.S. kPa | E % | TMA °C. |
|---|---|---|---|---|---|---|---|---|---|---|
| JM-B6aH | 15-65-15 | 2 | A | 12 | 5.24 | 6.00 | 0.17 | 32 | 518 | 71 |

Polymerisation Example D

A mixed methacrylate triblock was prepared as follows.

A. Preparation of Difunctional Lithium Initiator (DLI).

11 ml t-BuLi solution (0.248N) in cyclohexane was mixed with 14 ml m-DIB solution (0.0839N) in cyclohexane at room temperature and was reacted at 50° C. for 2 hours.

B. Polymerisation of butadiene.

6 ml DLI was added to a mixture of cyclohexane/diethyl ether (250 ml/20 ml). 20 ml butadiene was then added at 0° C. and polymerized at room temperature for 12 hours.

C. Random co-polymerisation of MMA and IBMA with pre-existing butadiene block.

First, 7 ml of diphenylethylene (DPE) solution (0.392N) in cyclohexane was added to an appropriate amount of the butadiene polymerisation mixture at room temperature; then 300 ml tetrahydrofuran (THF) containing 3 ml LiCl solution was added at 0° C. and this intermediate mixture was then brought to −78° C. A mixture of IBMA (3 ml) and MMA (3 ml) was added to the above intermediate mixture and polymerized for 2 hours. Copolymer was recovered by precipitation in 2l methanol. The mixed methacrylate triblock produced was hydrogenated by methods similar to those of Polymerisation Example B to yield an (MMA/IBMA)-EB-(MMA/IBMA) triblock in which the EB:MMA:IBMA ratio was 0.66:0.17:0.17. This was used to make a gel as follows.

Gel Example 4.

A gel was prepared along the lines of Gel Example 1 using the mixed methacrylate triblock of Example D, with results shown in Table 4.

TABLE 4

| Sample | Mn(×1000) | S | O | T % | G' 0.1 Hz kPa | G' 1.0 Hz kPa | tan delta 1.0 Hz | T.S. kPa | E % | TMA °C. |
|---|---|---|---|---|---|---|---|---|---|---|
| 4414-10 | 9.5-37-9.5 | 2 | A | 12 | 2.83 | 2.99 | 0.10 | 20 | 368 | 104 |

The molecular weights of the triblock copolymer in this gel are near the low end of the preferred ranges hereinbefore described. Increasing Mn, especially in the methacrylate end blocks, is expected to produce gels of progressively higher TMA softening points. Increasing the IBMA:MMA ratio (1:1 in this example) may also be expected to influence the temperature performance of the gel.

A further aspect of the present invention involves the addition to the triblock gels (especially to gels of the relatively sterically-unhindered lower alkyl (preferably methyl) methacrylate triblocks) of alkylmethacrylate homopolymer in substantially isotactic form. The preferred added homopolymers are the substantially isotactic forms of relatively sterically-unhindered lower alkyl (preferably methyl) methacrylates. Despite the dilution of the triblock and the potentially interfering presence of relatively large amounts of the rubbery mid-block and the extender oil in the gel composition, this addition of substantially isotactic homopolymer has been found to raise the temperature performance of the triblock gels as a whole. The added substantially isotactic homopolymer is surprisingly successful in seeking out and improving the methacrylate end blocks of the highly-extended gel-forming triblocks, especially when the added homopolymer comprises the same methacrylate (preferably methylmethacrylate) as is present in the end blocks. This aspect of the invention is exemplified as follows:

Gel Example 5

The softening points of solvent-cast MMA-EB-MMA triblock gel Samples prepared along the lines of Example 1 were compared with those of corresponding gels having 1 mole of substantially isotactic (92% isotactic) PMMA (iMMA) added to the casting solution per 2 moles of syndiotactic PMMA. Results are shown in the following Table 5.

TABLE 5

| Sample | Mn(×1000) | S | O | T % | G' 0.1 Hz kPa | G' 1.0 Hz kPa | tan delta 1.0 Hz | TMA softn °C. | DSC meltg °C. |
|---|---|---|---|---|---|---|---|---|---|
| M6-30H | 25-80-25 | 1 | A | 12 | 2.07 | 2.49 | 0.24 | 185 | — |
| M6-iMMA | 25-80-25 | 1 | A | 12 | 2.05 | 2.49 | 0.20 | 195 | 185 |

DSC analysis clearly indicates stereocomplex formation between the added isotactic PMMA and the MMA end blocks of the gel-forming hydrogenated triblock. Increased melting/softening points are similarly observed on addition of the substantially isotactic PMMA to unhydrogenated MMA-B-MMA triblock gels.

SYNTHESIS OF NEW ALKYL METHACRYLATE TRIBLOCKS & MULTIBLOCKS

In a first aspect of these syntheses, poly-isobornylmethacrylate (PIBMA) may be made by anionic polymerisation of isobornyl methacrylate at a temperature up to 40° C., preferably within the range from −78 to 40° C., more preferably within the range from 0 to 30° C., especially preferably within the range from 10 to 25° C.

It has unexpectedly been found that this polymerisation may be effected at relatively convenient temperatures using sterically unhindered initiators such as trimethylsilylmethyl lithium, whereas the known anionic polymerisation of methylmethacrylate must be conducted at less than −60° C. using a sterically hindered initiator such as 1,1'-diphenyl-3,3'-dimethylbutyl lithium to obtain a satisfactorily narrow range of molecular weights in the polymer product.

In a second aspect of these syntheses, a diblock or multiblock copolymer of (a) methylmethacrylate and (b) a $C_2$ (preferably $C_4$)-or-higher alkyl (preferably isobornyl) methacrylate may be made by anionic polymerisation of either (a) or (b) to form a living polymer, followed by addition and anionic polymerisation of the other monomer (b) or (a), the polymerisation of (b) preferably being conducted under conditions specified for the first aspect above, and the polymerisation of (a) being conducted at a temperature lower than −40° C., preferably lower than −60° C.

In a third aspect of these syntheses, a random copolymer of (a) methylmethacrylate and (b) a $C_2$ (preferably $C_4$)-or-higher alkyl (preferably isobornyl) methacrylate may be made by anionic polymerisation of a mixture of the respective monomers at a temperature lower than −40° C., preferably lower than −60° C.

These random and block copolymers, preferably consisting substantially only of the said components (a) and (b), can be made to provide unique combinations of properties derived from the respective monomers, the mol. proportions of the methylmethacrylate to the $C_2$ (preferably $C_4$)-or-higher alkyl methacrylate preferably being within the range from 5:95 to 95:5, more preferably 30:70 to 70:30. These random and diblock copolymers may be especially useful as end blocks in gel-forming methacrylate triblock copolymers, as described hereinbefore. Some or all of the methylmethacrylate component (a) may be replaced by a $C_2$ (preferably $C_4$)-or-higher alkyl methacrylate other than that chosen for component (b), and this aspect of the new syntheses may be used accordingly to make a diblock, multiblock, or random copolymer (i) of methylmethacrylate and a $C_2$ (preferably $C_4$)-or-higher alkyl (preferably isobornyl) methacrylate, or (ii) of two or more $C_2$ (preferably $C_4$)-or-higher alkyl methacrylates with or without methymethacrylate.

In a fourth aspect of these syntheses, an alkylmethacrylate-alkylene-alkylmethacrylate triblock copolymer, may be made by (i) polymerisation of an alkylene monomer (preferably butadiene or isoprene) in a substantially apolar solvent (preferably cyclohexane and/or toluene), preferably with added more-polar solvent (preferably diethyl ether), to form a difunctional living polyalkylene block, followed by anionic polymerisation, in the presence of that polyalkylene block, of an alkylmethacrylate by a method according to any of the above first, second, and third aspects of the present syntheses.

General methods, materials and conditions for performing this fourth aspect of the present syntheses may be adapted, for example, from those described in the aforementioned EP-A-0431706, or in the aforementioned paper by Ladd and Hogan-Esch in Polym. Prepr., 30(1), 261, 1989. Preferably, the polymerisation of the alkylene monomer for mid-block of the triblock synthesis will use a difunctional alkali metal alkyl initiator, such as difunctional 1,3-phenylene-bis(3,3-dimethylpentylidene)di-lithium. It is preferred to use for the polymerisation of the alkylmethacrylate end blocks a difunctional alkali metal initiator, for example difunctional 1,3-phenylene-bis(3,3-dimethylpentylidene)di-lithium. For synthesis of the methacrylate homopolymer and random or block methacrylate copolymers, mono-functional initiators may also be used, for example sec- or tert-butyl lithium reacted with diphenylethylene.

The triblock synthesis will preferably include the additional step of hydrogenating the polyalkylene block. The hydrogenation step converts the preferred polybutadiene or polyisoprene mid-block to ethylene/butylene or ethylene/propylene respectively, and mixed mid-blocks containing both may also be used.

In all of the syntheses according to this invention, it may be preferred that anionic polymerisation of the alkylmethacrylate is effected in the presence of a polar solvent, preferably comprising tetrahydrofuran (THF), preferably in a mixture with substantially apolar solvent, preferably toluene or cyclohexane. The mixture of polar and apolar solvents has been found advantageously to narrow the molecular weight range of the resulting polymers and may be used to vary their tacticity, for example from 60% syndiotactic PIBMA in THF to 65% isotactic PIBMA in toluene, both at −78° C.

The alkylene mid-blocks of the triblock or multiblock copolymers will preferably comprise polyisoprene, polybutadiene, or more preferably poly(ethylene/butylene) and/or poly(ethylene/propylene). The alkylmethacrylate blocks of the copolymers will preferably comprise diblock, multiblock, or random copolymers of methylmethacrylate and a $C_2$ (preferably $C_4$)-or-higher alkyl (preferably isobornyl) methacrylate. The number average molecular weight Mn of the triblock copolymers for some purposes is preferably within the range 40,000–300,000, the methacrylate end blocks preferably having Mn within the range 6000–70,000, and the alkylene mid-blocks perferably having Mn within the range 30,000–160,000. However, these or other molecular weights will be selected to suit the desired end use of the polymers, for example for making gels.

The various aspects of the present syntheses will now be further illustrated by the following specific examples using isobornylmethacrylate. Materials and conditions for these were generally as follows:

A. Materials preparation:

Methylmethacrylate (MMA) from Aldrich and isobornylmethacrylate (IBMA) from Acros Chimica were first refluxed over $CaH_2$ under a nitrogen atmosphere. They were then distilled under vacuum and stored under nitrogen at −20° C. Just before polymerization, the IBMA was added at −78° C. to a 50/50 v/v mixture of diisobutyl aluminum hydride (DIBAH: 0.1N in toluene) and triethylaluminium (TEA: 0.1 N in toluene) until a persistent yellowish-green colour was observed, whereas MMA was added at room temperature to TEA solution. They were then redistilled under reduced pressure and polymerized.

LiCl (99.99% purity from Aldrich) was dried overnight at 130° C. and dissolved in dry THF (0.5N solution). Cyclohexane and diethyl ether were dried over $CaH_2$ for 24 hours. THF was purified by refluxing over the deep purple sodium-benzophenone complex. All the solvents were further distilled from polystyryllithium under reduced pressure immediately before use. Tert-butyllithium (t-BuLi) from Aldrich (1.3M in cyclohexane) was diluted with cyclohexane into a 0.248N solution as determined by double titration. Meta-diisopropenylbenzene (m-DIB) from Aldrich was first distilled over $CaH_2$ for 24 hours and then from fluorenyllithium before use. 1,1-diphenyl ethylene (DPE) from Aldrich was dried over sec-BuLi and distilled from diphenylmethyl-lithium before use. Butadiene was dried over n-BuLi.

B. Initiators 1,1-diphenyl-3,3-dimethyl-butyl lithim (DDBLi) was used as a monofunctional initiator and prepared by addition of t-BuLi to DPE (diadduct). The t-BuLi/m-DIB diadduct was prepared in cylohexane at 50° C. for 3 hours and used as a difunctional initiator. Solutions of these mono- and di-functional initiators were homogenous with a deep red color.

C. Polymerization

Homopolymerization of IBMA and block copolymerization of butadiene and IBMA were carried out in glass reactor equipped with a magnetic stirrer under an inert atmosphere. Solvent, initiator and monomers were transferred with a syringe and/or capillaries. Details for the experimental techniques used in the synthesis of triblock copolymers were similar to those hereinbefore described. Briefly, the synthesis consisted of 3 steps: 1) butadiene was polymerized in a cyclohexane/diethyl ether mixture (100/6, v/v) at room temperature for one night; 2) PBD dianions were end-capped with diphenylethylene (DPE) at room temperature for 30 minutes; 3) THF was added at 0° C. so that a mixture of cyclohexane/THF (50/50, v/v) was prepared, to which IBMA was finally added and polmerized at either low or room temperature. Triblock copolymers were recovered by precipitation in methanol and dried at room temperature for 2 days in vacuum.

D. Hydrogenation

An alkyl metal/transition metal salt complex was used as homogeneous hydrogenation catalyst. The metal alkyl was triethyl aluminum (1 N in toluene) and the metal salt was cobalt 2-ethyl hexanoate (0.2 N in toluene). The catalyst complex was prepare by adding dropwise the transition metal salt to the metal alkyl in toluene under nitrogen. The molar ratio of component metals (alkyl/salt) was 3/1. Hydrogenation was conducted in a 5-liter autoclave equipped with a mechanical stirrer. A solution of 20 g of block copolymer in 3 l dry toluene was firstly mixed with the catalyst complex (about 0.03 moles of transition metal per mole of double bonds) and injected, and the reactor was closed and purged with nitrogen. The reactor was heated to 60° C., purged with hydrogen, hydrogen pressure was increased to 6 bar and the reaction allowed to proceed for approximately 3 hours. After hydrogenation, the catalyst was decomposed with dilute HCl. The copolymer was preciptated in methanol, washed and redissolved in toluene, reprecipitated and dried under vacuum.

E. Film preparation

Block copolymers were added with wt % hindered phenol antioxidant (tetrakis[methylene 3-(3',5'-di-t-butyl-4'-hydroxylphenyl)propionate]methane, Irganox 1010 Trade Mark from Ciba-Geigy Corp.) and dissolved in toluene. This solution (8 wt % copolymer) was poured into a Petri dish and the solvent was allowed to evaporate slowly over 3 to 4 days at room temperature. Films were dried to constant weight in a vacuum oven at 40° C. They were elastomeric, transparent and colourless with a smooth surface.

F. Analysis

Molecular weight and molecular weight distribution were measured by size exclusion chromatography (SEC) with a Waters GPC 501 apparatus equipped with linear styragel columns. THF was the eluent (flow rate of 1 ml/min) and polystyrene (PS) standards were used for calibration. The method by Benoit et al for the universal calibration was used with the following viscosimetric relationship: $[\eta]=1.36\times10^4$ $\alpha^{0.714}$ (PS in THF) $[\eta]=3.65\times10^{-5}$ $\alpha^{0.730}$ (PIBMA in THF). $^1H$ NMR spectra were recorded with a Bruker AM-400 spectrometer, by using $CDCl_3$ as a solvent. Content of the PBD 1,2-units was calculated by $^1H$ NMR from the relative intensity of the signal at 4.9 ppm (CH=: 1,2 double bond), 5.4 ppm (CH=: 1,2 plus1,4 double bond). Tacticity of PIBMA was calculated by quantitive $^{13}C$ NMR. Composition of the copolymer was calculated by 1H NMR from the signal for the 1,2 units of PBD and signal at 4.4 ppm for the O—CH of the IBMA units. Mn for PIBMA was calculated from composition and PBD molecular weight. IR spectra were recorded with the 600 FT-IR Perkin-Elmer spectrometer. Differential scanning calorimetry (DSC) was carried out with a DuPont 900 instrument, calibrated with indium. The heating rate was 20° C./min, and glass transition temperature was reported as the inflection point of the heat capacity jump. Width of glass transition (Tg) was defined as the difference in the temperatures of the intersections of the tangent to the heat capcity curve at Tg with the extrapolated baselines.

Dynamic Mechanical Analysis (DMA) was carried out with a TA 983 Dynamic Mechanical Analyser (du Pont). Samples (8×10×2 mm) were deformed at constant frequency (1 Hz) and strain amplitude (0.4 mm).

Tensile measurements were conducted with a Adharmal Lomargy tensile tester. Testing samples (microdumbells) cut from solution cast films was extended at 200 mm/min at room temperature. Reported data are the average of three measurements.

SYNTHESIS EXAMPLE 1

Polyisobornyl Methacrylate (PIBMA)

1 ml t-BuLi was added to 40 ml THF containing 3 ml DPE solution (0.392N) in cyclohexane and 2 ml LiCl solution at 0° C. The solution was then brought to the reaction temperature (from −78 to 40° C.), 3 ml of IBMA was added and allowed to polymerize for about 1 hour. Polymer was recovered by precipitation in 200 ml methanol. Note: here the reaction product of t-BuLi and DPE, that is 1,1-diphenyl-3,3-dimethylbutyl lithium (DDBLi), was used as an iniiator. As an alternative example, trimethylsilyl-methyllithium (($(Me)_3SiCH_2Li$) was used to directly polymerize IBMA without reacting with DPE. PIBMA of Mn as high as 100,000 with very narrow molecular weight range (<1.15) was obtained at temperature from −78 to 25° C. This is very interesting, since PMMA of narrow Mn distribution can only be obtained at temperature lower than −60° C. by usual anionic polymerization techniques, even with sterically hindered initiator, such as DDBLi, whereas trimethylsilymeth-yllithium is not very sterically hindered and still produces PIBMA of very narrow Mn distribution at room temperature.

Monomer purification is a key issue in living polymerization of methacrylate esters. In case of branched alkyl methacrylate, the present branched alcohol is the main impurity, whose complete elimination is a problem compared to the normal equivalent because of a lower reactivity toward triethyl aluminum (TEA). An efficient purification technique has been proposed and applied to t-butyl methacrylate (tBMA), that consists of the addition of diisobutyl aluminum hydride (DIBAH) to the TEA solution. This method has been successfully used for the purification of isobornyl methacrylate (IBMA) in the present invention, since polymerization of accordingly purified IBMA provides a polymer of a narrow molecular weight distribution (<1.25) in THF as shown in Table 1. Nevertheless IBMA must be separated from the DIBAH/TEA mixture by distillation prior to polymerization. The high boiling point of IBMA (245° C./760 mm Hg) is responsible for the partial polymerization even when distillation is conducted at 110° C. under reduced pressure. In order to avoid that drawback, IBMA has been tentatively polymerized in the presence of the residual DIBAH/TEA mixture. Table 1 shows that samples P3 and P8 that have been prepared with the non-distilled monomer do not significantly differ from the P1 and P4 samples prepared with IBMA previously distilled.

It is worth noting that initiation of the IBMA polymerization by DDBLI in THF and in toluene is slower compared to MMA. Indeed, the red color of the initiator does not disappear immediately but slowly when the monomer is added, in sharp contrast to what happens when MMA is the monomer.

In samples P1 and P2, molecular weight, molecular weight distribution, monomer conversion and Tg are the same although the polymerization temperature is very different, i.e. −78° C. for P1 and 0C for P2.

Although PIBMA prepared in THF (P1 to P3 samples) has a rather narrow molecular weight distribution (1.25), a small tail is observed on the low molecular weight side.

The anionic polymerization of IBMA has been repeated in THF in the presence of LiCl "ligand" with a LiCl/initiator molar ratio of 5. Table 1 shows that the molecular weight distribution becomes narrower (1.05), and spectra confirm that the low molecular weight tail has disappeared. When the polymerization temperature is increased from −78° C. to 40° C. (samples P4 to P7 in Table 1), the molecular weight distribution is slightly increased from 1.05 to 1.15 and the experimental molecular weight remains in a good agreement with the theoretical value. Nevertheless, the chain tacticity is affected, since syndiotacticity of PIBMA is decreased from 70% to 50% at the expense of the hetero triads. Thus compared to the anionic polymerization of MMA, which is adversely affected by the polymerization exotherm (>10° C.) at −78° C., no side reaction occurs in the course of the anionic polymerization of IBMA in a large temperature range. So a careful control of the reaction exotherm is not required.

In addition to polymerization temperature and ligand, solvent polarity also affects the polymer tacticity and the "livingness" of polymerization. The stereochemical addition of the incoming monomer to the propagating enolate is indeed strongly dependent on the presence or absence of peripheral solvation. Table 1 reports polymerization experiments not only in THF, but also in apolar solvents such as toluene and cyclohexane, and 9/1(v/v) mixture of these solvents and THF in which LiCl has a limited solubility compared to complete insolubility in pure apolar solvent. Similarly to tBMA, polymerization of IBMA is not "living" in an apolar solvent at room temperature and a broad molecular weight distribution is observed, 2.25 in toluene and 5.05 in cyclohexane, as shown in Table 1. This situation is however significantly improved by addition of 10% THF, since the molecular weight distribution dramatically decreases down to 1.25 in the 9/1(v/v) toluene/THF mixture and to 1.20 in the cyclohexane/THF mixture of the same composition. The effect of solvent polarity on chain tacticity in synthesis at 25° C. is clearly illustrated by comparison in Table 1 of sample P6 (55% syndiotactic triads in THF), sample P9 (65% isotactic triads in toluene), and sample P10 (37% syndiotactic triads in toluene/THF 9/1 v/v). Thus, combination of a polar and an apolar solvent allows control of tacticity over a wide range. The glass transition temperature (Tg) of PIBMA homopolymer (see Table 1) ranges from 174° C. to 206° C. depending on the chain tacticity. These values are in good agreement with Tg of PIBMA of comparable tacticity synthesized by a radical process.

TABLE S1

Polymerization of isobornyl methacrylate (IMBA) with 1,1-diphenyl-3,3-dimethyl-butyl lithium (DDBLi) as an initiator

| sample | solvent[a] | ligand[b] | reactn time hours | reactn temp (° C.) | yield (5)[c] | Mn cal[d] | Mn SEC[e] | Mw/Mn | (%)microstructure[f] s | h | i | Tg[g] (° C.) |
|---|---|---|---|---|---|---|---|---|---|---|---|---|
| P1 | THF | / | 2 | −78 | 100 | 14700 | 19000 | 1.25 | 66 | 34 | 0 | 196 |
| P2 | THF | / | 2 | 0 | 100 | 14700 | 16000 | 1.25 | 58 | 39 | 3 | 199 |
| P3[n] | THF | / | 2 | −78 | 100 | 19800 | 27000 | 1.30 | 74 | 26 | 0 | 206 |
| P4 | THF | LiCl | 1 | −78 | 78 | 12000 | 19000 | 1.05 | 70 | 27 | 3 | 202 |
| P5 | THF | LiCl | 1 | 0 | 83 | 12000 | 19000 | 1.05 | 61 | 37 | 2 | 195 |
| P6 | THF | LiCl | 1 | 25 | 91 | 13000 | 19000 | 1.15 | 55 | 43 | 2 | 198 |
| P7 | THF | LiCl | 1 | 40 | 93 | 13000 | 19000 | 1.15 | 50 | 45 | 5 | 196 |
| P8[n] | THF | LiCl | 1 | −78 | 90 | 13000 | 19000 | 1.05 | 73 | 27 | 0 | 197 |
| P9 | Tol | / | 12 | 25 | 100 | 29000 | 72000 | 2.25 | 2 | 33 | 65 | 174 |
| P10 | Tol/THF | LiCl | 1.5 | 25 | 100 | 29000 | 26000 | 1.25 | 37 | 41 | 22 | 194 |
| P11 | CH | / | 12 | 25 | 80 | 29000 | 33000 | 5.05 | 8 | 32 | 60 | 177 |
| P12 | CH/THF | LiCl | 1.5 | 25 | 83 | 29000 | 31000 | 1.20 | 34 | 46 | 20 | 192 |

[a]Tol = toluene, Tol/THF = toluene/THF(9/1 v/v), CH = cyclohexane, CH/THF=cyclohexane/THF(9/1 v/v);
[b]Ligand:Initiator mol ratio = 5;
[c]Ratio of recovered polymer weight to charged materials weight;
[d]Charged monomer weight divided by initiator molar number for living polymerisation;
[e]Based on polystyrene calibration and accordingly calculated;
[f]NMR $^{13}$C;
[g]by DSC, heating rate 20° C./min;
[h]monomer added together with residues of DIBAH/Et$_3$Al purification agents.

SYNTHESIS EXAMPLE 2
Block Copolymerization of MMA and IBMA 1 ml t-BuLi was added to a mixture of 40 ml THF containing 3 ml DPE solution (0.392N) in cyclohexane and 2 ml LiCl solution at 0° C. The solution was then brought to −78° C., and 3 ml MMA was added and polymerized for 1 hour. An aliquot was taken out for SEC analysis in order to determine the Mn of PMMA sequence. 3 ml of IBMA was then added and allowed to polymerize for 1 hour. Copolymer was recovered by precipitation in 200 ml methanol.

SYNTHESIS EXAMPLE 3
Random Copolymerization of MMA and IBMA 2 ml t-BuLi was added to a mixture of 60 ml THF and 4 ml LiCl solution containing 4 ml DPE solution (0.392N) in cyclohexane at 0° C. The solution was then brought to −78° C., and a mixture of MMA (3 ml) and IBMA (3 ml) was then added and allowed to polymerize for 1 hour. Copolymer was recovered by precipitation in 200 ml methanol.

The properties of the copolymers produced by Examples 2 and 3 are shown in Table 2.

nique is also successful in preparation of triblock copolymer in which PIBMA is substituted for PMMA. Typical SEC traces show an identical symmetrical, very narrow molecular weight distribution for both PBD midblock and the triblock copolymer (1.10), which indicates that the polybutadienyl dianions end-capped by DPE quantitatively initiate polymerisation of the IBMA. A major advantage of IBMA over MMA is that copolymerization of the methacrylic monomer can be conducted at 25° C., instead of −78° C., while keeping intact the control on the molecular structure of the triblock. The C3 sample synthesised at 25° C. has indeed the same molecular weight characteristics as the C1 sample prepared at −78° C. for the IBMA polymerization. As in case of IBMA homopolymerization, the use of IBMA containing the purification agents (DIBAH/TEA mixture) (Sample C2) rather than the corresponding distilled monomer (samples C1 and C3) does not perturb the copolymerization course. In all cases, a very narrow molecular weight distribution is observed (1.10). It is worth pointing out that no gelation occurs upon addition and polymerization of IBMA even at −78° C. in cyclohexane/THF(60/40, v/v) at a 7 wt % polymer concentration, although in case of MMA, a

TABLE S2

Block and random copolymerization of MMA and IBMA

| sample | T (° C.) | MMA/ IBMA calc[a] | MMA/ IBMA Exp[b] | yield (%)[c] | Mn[a] | Mw/ Mn[d] | Tg (° C.)[e] | Type |
|---|---|---|---|---|---|---|---|---|
| Mc20a | −78 | 49/51 | 52/48 | 90 | 12000 each | 1.04 | 143/182 | block |
| Mc35a | −78 | 16/84 | 19/81 | 85 | 14000 | 1.07 | 167 | random |
| Mc30d | −78 | 33/67 | 37/63 | 90 | 12000 | 1.10 | 156 | random |
| Mc20b | −78 | 49/51 | 51/49 | 85 | 23000 | 1.07 | 150 | random |
| Mc26a | −78 | 66/34 | 63/37 | 90 | 13000 | 1.08 | 140 | random |
| Mc35b | −78 | 83/17 | 85/15 | 80 | 18000 | 1.05 | 136 | random |
| Mc26b | 0 | 33/67 | 34/66 | 80 | 13000 | 1.46 | 154 | random |

[a]Weight ratio, calculated from charged monomer weights;
[b]Weight ratio by $^1$H NMR;
[c]Recovered polymer weight to charged monomer weight;
[d]by SEC with PS for calibration;
[e]DSC heating rate is 20° C./min.

SYNTHESIS EXAMPLE 4
Synthesis of IBMA-butadiene(B)-IBMA Triblock Copolymer

A. Preparation of Difunctional Lithium Initiator (DLI).

11 ml t-BuLi solution (0.248N) in cyclohexane was mixed with 14 ml m-DIB solution (0.0839N) in cyclohexane at room temperature and was reacted at 50° C. for 2 hours.

B. Polymerisation of butadiene.

6 ml DLI was added to a mixture of cyclohexane/diethyl ether (250 ml/20 ml). 20 ml butadiene was then added at 0° C. and polymerized at room temperature for 12 hours.

C. Polymerisation of IBMA.

7 ml DPE solution (0.392N) in cyclohexane was added to the mixture resulting from step B at room temperature, then 300 ml THF containing 3 ml LiCl solution was added at 0° C. and the mixture was brought to the reaction temperature. Then 7 ml IBMA was added and polymerized for 2 hours. Copolymer was recovered by precipitation in 2l of methanol. Alternative samples were conducted at reaction temperatures of −78° C., or 25° C., and copolymers of narrow Mn distribution (<1.10) were obtained even at 25° C., which exhibited high strength (tensile strength >30 MPa, elongation at break >1000%).

Synthesis of well defined PMMA-PBD-PMMA (MBM) triblock copolymers is achieved by using the m-DIB/t-BuLi diadduct as a difunctional initiator for the butadiene polymerization. Table 3 (synthesis conditions) and Table 4 (thermal and mechanical properties) show that this techgel is immediately formed when the monomer is added to a 50/50(v/v) cyclohexane/THF at a 3 wt % polymer concentration. Thus a smaller THF content, a higher polymerization concentration and a much higher polymerization temperature compared to MMA make the PIBMA-PBD-PIBMA triblock copolymers very promising materials for industrial production.

In order to illustrate the range of end products that can be made available by living block copolymerization of IBMA, a the triblock copolymer of sample C1 was hydrogenated (sample C1H, Table 4) by methods generally indicated hereinbefore using a Co/Al catalyst. FTIR and $^1$H NMR analysis confirm the quantitative conversion of the PBD to the saturated counterpart which is much more resistant to oxidation and better suited to high temperature applications. Spectra show the IR absorptions at 960 and 910 cm$^{-1}$ for 1,4 and 1,2-units respectively, and at 1640 cm$^{-1}$ for the C=C stretching have disappeared, in contrast to the absorption of PIBMA at 1725 cm$^{-1}$ which remains unchanged after hydrogenation, although this polymethacrylate is known for propensity to hydrolyse in the presence of an acid. SEC analysis shows the molecular weight distribution remains narrow: 1.15 instead of 1.10 before hydogenation. A small shoulder on the high molecular weight side of the elution peak is however detected, the origin of which is still unclear.

From the DSC trace of toluene cast films of triblock copolymers, Tg of the polybutadiene block is clearly observed at ca. −60° C., independently of the hard block PMMA or PIBMA. The hydrogenated sample (C1H) shows an ethylene/butylene (E/B) block of very broad and ill-defined melting endotherm with a very diffuse maximum at ca. −7° C., which indicates that the E/B central block tends to crystallize with formation of poorly organized crystalline phases, as has been observed for known styrene-ethylene/butylene-styrene (SEBS) triblock copolymers.

I/M represents a random copolymer of IBMA and MMA. I-M represents a block copolymer of IBMA and MMA. The preparation of DLI and polymerization of butadiene are the same as in the Example 4 synthesis of IBI triblock copolymers. Co-polymerisation of MMA and IBMA with pre-existing butadiene block was effected as follows. First, 7 ml

TABLE S3

Synthesis of AMA-B-AMA triblock copolymers with m-diisopropenyl benzene (m-DIB)/t-BuLi as an difunctional initiator

| | | | | PBD | | | | PAMA | | |
|---|---|---|---|---|---|---|---|---|---|---|
| sample | PAMA | T (° C.)[a] | yield (%)[b] | Mn · 10⁻³ cal.[c] | Mn · 10⁻³ SEC[d] | 1,2 (%)[e] | Mw/Mn[d] | Mn[f] | cont[e] (%) | Mw/Mn |
| C1 | PIBMA | −78 | 100 | 50 | 60 | 43 | 1.10 | 2 × 15000 | 33 | 1.10 |
| C2[g] | PIBMA | −78 | 100 | 50 | 60 | 45 | 1.10 | 2 × 15000 | 33 | 1.10 |
| C3 | PIBMA | 25 | 100 | 50 | 60 | 43 | 1.10 | 2 × 15000 | 33 | 1.10 |
| M | PMMA | −78 | 100 | 50 | 60 | 43 | 1.10 | 2 × 16000 | 34 | 1.10 |

[a]polymerization temperature for methacrylate monomer;
[b]weight ratio of recovered polymer to charged monomers;
[c]calculated as the ratio of monomer weight to molar number of initiator;
[d]SEC with PS calibration;
[e] ¹H NMR analysis;
[f]Mn was calculated from the copolymer composition and the PBD molecular weight;
[g]IBMA monomer was purified with no distillation.

TABLE S4

Thermal and mechanical properties of PIBMA-PBD-PIBMA and MBM triblock copolymers

| sample | Tg 1[a] (° C.) | Tg2[a] (° C.) | Initial Modulus (MPa) | Tensile Strength (MPa) | Elong. at break (%) | Permanent set at break (%)[b] |
|---|---|---|---|---|---|---|
| C1 | −58(−50) | /(170) | 19 | 30 | 1000 | 40 |
| C2 | −58 | / | 18 | 28 | 1000 | 53 |
| C3 | −58 | / | 18 | 30 | 1050 | 47 |
| C1H | −53 | / | 90 | 33 | 560 | 50 |
| M | −60(−50) | /(130) | 6 | 33 | 900 | 47 |

[a]DSC heating rate 20° C./min, values in parentheses by DMA at 1 Hz with heating rated 5° C./min;
[b]ratio of the unrecoverable deformation to initial sample length at break.

SYNTHESIS EXAMPLE 5

Synthesis of I/M-B-I/M and I-M-B-M-I Triblock Copolymers.

DPE solution (0.392N) in cyclohexane was added to the butadiene polymerisation mixture at room temperature; then 300 ml THF containing 3 ml LiCl solution was added at 0° C. and this intermediate mixture was then brought to −78° C.

For I/M-B-I/M, a mixture of IBMA (3 ml) and MMA (3 ml) was added to the above intermediate mixture and polymerized for 2 hours. Copolymer was recovered by precipitation in 2l methanol.

For I-M-B-M-I, 3 ml MMA was added to the intermediate mixture and polymerized for 1 hour. Then 3 ml IBMA was added and polymerized for another 1 hour. Copolymer was recovered by precipitation in 2l methanol.

The properties of the mixed methacrylate triblocks produced are shown in Table 5.

TABLE S5

Synthesis and properties of mixed methacrylate triblock copolymers

| | | PBD | | | | | | Tensile properties (25° C.) | | |
|---|---|---|---|---|---|---|---|---|---|---|
| | end | Mn | Mn | 1,2 | composition[c] | | | Mw/ | T.S. | EB | Set |
| sample | block | cal[b] | sec[c] | %[d] | B | M | I | Mn[e] | (MPa) | (%) | (%) |
| Mc24a | I/M | 46000 | 56000 | 42 | 66 | 17 | 17 | 1.10 | 24 | 1010 | 50 |
| Mc24b | I/M | 46000 | 60000 | 42 | 66 | 24 | 10 | 1.10 | 27 | 996 | 50 |
| Mc33a | I-M | 46000 | 56000 | 43 | 67 | 16 | 17 | 1.10 | 30 | 1130 | 38 |
| Mc33b | I-M | 46000 | 56000 | 41 | 66 | 10 | 24 | 1.10 | 30 | 1100 | 33 |

[a]I = IBMA, M = MMA, B = butadiene;
[b]ratio of charged monomer to molar number of initiator;
[c]with PS for calibration;
[d]¹H NMR;
[e]from charged monomer weights;
[f]T.S. = Tensile Strength, EB = Elongation at Break, set = permanent set at break calculated as ratio of irreversible deformation at break to initial length of sample.

SYNTHESIS EXAMPLE 6
Ethylmethacrylate-Butadiene-Ethylmethacrylate Triblock Copolymer When synthesised by methods similar to those known for corresponding methylmethacrylate triblocks at block molecular weights (Mn×10$^{-3}$) of 13-59-13 and 1,2% of 41, the above EMA-B-EMA triblocks displayed at room temperature relatively high tensile strength of 19 MPa and elongation at break of 1130%, which may provide useful properties when EMA is combined with MMA in the mixed methacrylate copolymers according to the present invention hereinbefore described. However, the Tg of the ethylmethacrylate blocks is relatively low, e.g. about 80° C., and the higher alkyl (preferably C$_4$-or-higher alkyl, especially isobornyl) methacrylates may therefore be preferred for the mixed methacrylate diblock and triblock copolymers.

SYNTHESIS EXAMPLE 7
MMA-Styrene-Butadiene-Styrene-MMA Pentablock

By methods corresponding to those hereinbefore described, sequential living anionic polymerisation of butadiene (B), styrene (S), and methylmethacrylate was performed to produce an M-S-B-S-M pentablock copolymer (A6) and its hydrogenated derivative M-S-EB-S-M (A6H) having properties shown in Table S6.

| sample | Mn$^a$ × 10$^{-3}$ | PBD$^b$ (wt %) | 1,2 (%) | PMMA (wt %) | Tg1$^c$ (° C.) | Tg2$^c$ (° C.) |
|---|---|---|---|---|---|---|
| A6 | 19-18-79-18-19(153) | 52 | 43 | 24 | −60 (−55) | 110 (130) |
| A6H | Mw/Mn$^d$ = 1.20 | | | | −50 (−49) | 112 (128) |

$^a$by SEC and $^1$H NMR, total Mn in brackets;
$^b$by $^1$H NMR;
$^c$by DSC at 20° C./minute heating rate (by DMA at 1 Hz in brackets);
$^d$by SEC with polystyrene calibration standards.

We claim:

1. A gel composition comprising at least 4% by weight and not more than 30% by weight of a methacrylate-alkylene(hydrogenated or unhydrogenated)-methacrylate triblock copolymer having number average molecular weight Mn of at least 50,000 and at least 200 parts by weight of extender liquid per 100 parts by weight of the triblock copolymer, which liquid extends and softens the polyalkylene mid-block of the triblock copolymer.

2. A gel composition according to claim 1, wherein the methacrylate end blocks of the triblock copolymer are polymethylmethacrylate.

3. A gel composition comprising according to claim 1, having at least 2 carbon atoms in the alkyl group of the methacrylate.

4. A gel composition according to claim 3, wherein the methacrylate end blocks of the triblock copolymer comprise isobornylmethacrylate.

5. A gel composition according to claim 3, wherein the methacrylate end blocks of the triblock copolymer comprise a random or block copolymer of a C$_2$-or-higher alkyl methacrylate and methylmethacrylate.

6. A gel composition according to claim 5, wherein the higher alkyl methacrylate is or includes isobornyl methacrylate.

7. A gel composition according to claim 1, wherein the methacrylate end blocks of the triblock copolymer have Mn within the range from 7,000 to 40,000.

8. A gel composition according to claim 1 wherein the polyalkylene mid-blocks of the triblock copolymer have Mn within the range from 40,000 to 150,000.

9. A gel composition according to claim 1, wherein the polyalkylene mid-blocks of the triblock copolymer comprise unhydrogenated polydiene blocks.

10. A gel composition according to claim 1, wherein the polyalkylene mid-blocks of the triblock copolymer comprise hydrogenated polydiene blocks selected from poly(ethylene/butylene) and poly(ethylene/propylene).

11. A gel composition according to claim 1, including added substantially isotactic methacrylate homopolymer.

12. A gel composition according to claim 11, wherein the added homopolymer comprises substantially isotactic polymethylmethacrylate.

13. A gel composition according to claim 1, having an ultimate elongation of at least 200%.

14. A gel composition according to claim 1, having an ultimate elongation of at least 300%.

15. A gel composition according to claim 1, having an ultimate elongation of at least 500%.

16. A gel composition according to claim 1, wherein the said triblock copolymer incorporates further blocks, thus constituting a pentablock or other multi-block copolymer.

17. A gel composition according to claim 16, wherein the said pentablock copolymer comprises either (a) at least two different methacrylate blocks M1, M2, or (b) at least one methacrylate block M and at least one styrene block S, on both ends of the alkylene mid-block A, the penta-block copolymer thus having the structure (a) M1-M2-A-M2-M1 or M-S-A-S-M.

* * * * *